United States Patent
Prabhakar et al.

(10) Patent No.: US 11,487,336 B2
(45) Date of Patent: Nov. 1, 2022

(54) TEMPERATURE RESTRICTED MODE FOR CELLULAR ENHANCEMENT

(71) Applicant: APPLE INC., Cupertino, CA (US)

(72) Inventors: Alosious Pradeep Prabhakar, Singapore (SG); Vijay Venkataraman, San Jose, CA (US); Sundarraman Balasubramanian, Paris (FR)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 15/991,444

(22) Filed: May 29, 2018

(65) Prior Publication Data

US 2019/0369682 A1  Dec. 5, 2019

(51) Int. Cl.
*G06F 1/20*  (2006.01)
*H04W 76/28*  (2018.01)
*H04W 52/02*  (2009.01)
*G06F 1/3237*  (2019.01)

(52) U.S. Cl.
CPC .............. *G06F 1/206* (2013.01); *G06F 1/203* (2013.01); *H04W 52/0274* (2013.01); *H04W 76/28* (2018.02); *G06F 1/3237* (2013.01); *H04W 52/0264* (2013.01)

(58) Field of Classification Search
CPC ........ G06F 1/206; G06F 1/203; G06F 1/3237; H04W 52/0274; H04W 76/28; H04W 52/0264
See application file for complete search history.

(56) References Cited

U.S. PATENT DOCUMENTS

| | | | | |
|---|---|---|---|---|
| 2012/0331207 A1* | 12/2012 | Lassa | ..................... | G06F 1/3278 711/103 |
| 2013/0332720 A1* | 12/2013 | Gupta | ................... | G06F 9/4893 713/100 |
| 2014/0078694 A1* | 3/2014 | Wissmar | ................ | G04G 17/04 361/749 |
| 2015/0134988 A1* | 5/2015 | Wang | ...................... | G06F 1/206 713/322 |
| 2015/0288792 A1* | 10/2015 | Nayak | ................... | H04M 1/675 455/558 |
| 2016/0066266 A1* | 3/2016 | Law | ..................... | H04W 52/028 455/574 |
| 2016/0162297 A1* | 6/2016 | Shao | ........................ | G06F 1/206 713/2 |
| 2017/0070894 A1* | 3/2017 | Kumar | ................ | H04W 52/028 |
| 2020/0008152 A1* | 1/2020 | Stauffer | ................ | H04W 76/30 |

* cited by examiner

*Primary Examiner* — Nathan L Laughlin
(74) *Attorney, Agent, or Firm* — Fay Kaplun & Marcin, LLP (57) ABSTRACT

A method, a device, and an integrated circuit utilizes a temperature restricted mode. The method includes determining a temperature of the device. When the temperature is below a first threshold, the method includes enabling a first mode comprising select network operations. When the temperature is above a brick threshold, the method includes enabling a second mode comprising disabling the select network operations. When the temperature is above the first threshold and below the brick threshold, the method includes enabling a third mode comprising modifying at least one of the select network operations.

11 Claims, 4 Drawing Sheets

TEMPERATURE RESTRICTED MODE FOR CELLULAR ENHANCEMENT

BACKGROUND INFORMATION

A user equipment (UE) may be utilized in a variety of manners to provide numerous features. In a first example, the UE may include independent operations that are performed using components of the UE such as programs or applications installed on the UE that are executed in an online or offline capacity. For example, the independent operations may be a notes application, a game application, a camera application, a health monitoring application, etc. In a second example, the UE may include further operations that utilize data exchanged with another electronic device or network such as programs or applications installed on the UE that are executed in an online capacity. For example, the further operations may be a call application, a browser application, a social media application, etc. In utilizing the further operations, the UE may establish a connection such as a network connection to various types of networks or a peer connection to another UE.

When the UE is mobile, the UE may be utilized in various different locations while the user of the UE is performing any of a variety of different activities. For example, the UE may be indoors or outdoors. Also, depending on environmental conditions related to the weather, the location of the UE may affect a temperature of the UE, particularly an internal temperature of the components of the UE. When the temperature of the UE exceeds a predetermined threshold, the UE may be configured to deactivate network operations and components associated therewith. However, the environmental conditions may cause the UE to reach the predetermined threshold even with minimal utilization of the network operations. Accordingly, the network operations may be deactivated entirely which results in a poor user experience as the temperature must be reduced to an acceptable threshold before being re-activated.

SUMMARY

An exemplary embodiment is described as including a method performed by a device connected to a network. The method includes determining a temperature of the device. When the temperature is below a first threshold, the method includes enabling a first mode comprising select network operations. When the temperature is above a brick threshold, the method includes enabling a second mode comprising disabling the select network operations. When the temperature is above the first threshold and below the brick threshold, the method includes enabling a third mode comprising modifying at least one of the select network operations.

Another exemplary embodiment is described that includes a device having a transceiver configured to establish a connection to a network, a sensor configured to determine a temperature of the device and a processor configured to utilize a first mode, a second mode, or a third mode. When the temperature is below a first threshold, the processor enables the first mode comprising select network operations. When the temperature is above a brick threshold, the processor enables the second mode comprising disabling the select network operations. When the temperature is above the first threshold and below the brick threshold, the processor enables the third mode comprising modifying at least one of the select network operations.

In a further exemplary embodiment, an integrated circuit is described. The integrated circuit includes first circuitry configured to establish a connection to a network. The integrated circuit includes second circuitry configured to determine a temperature. When the temperature is below a first threshold, the integrated circuit includes third circuitry configured to enable a first mode comprising select network operations. When the temperature is above a brick threshold, the integrated circuit includes fourth circuitry configured to enable a second mode comprising disabling the select network operations. When the temperature is above the first threshold and below the brick threshold, the integrated circuit includes fourth circuitry configured to enable a third mode comprising modifying at least one of the select network operations.

DETAILED DESCRIPTION

The exemplary embodiments may be further understood with reference to the following description and the related appended drawings, wherein like elements are provided with the same reference numerals. The exemplary embodiments are related to a device, system, and method for utilizing a temperature restricted mode (TRM) on a user equipment (UE). The mechanism according to the exemplary embodiments determines a variety of conditions of the UE to determine an operating mode of the UE. The operating mode may be a standard mode in which select operations are unrestricted, the TRM in which the select operations are systematically restricted, or a brick mode in which the select operations are restricted. The operating mode may be selected based on a temperature of the UE while considering further factors. In this description, the term "brick mode" refers to an operating mode of the UE where any user interaction is disabled (e.g., the UE is incapable of receiving input from a user and/or providing output to a user) and the wireless radios (e.g., cellular, WiFi, Bluetooth, GPS, etc.) are shutdown.

Initially, it is noted that the exemplary embodiments are described with regard to select operations that are restricted as including network operations or operations used in relation to a network connection. However, the use of network operations is only exemplary. The exemplary embodiments may be utilized to restrict other types of operations including independent operations performed by the UE. Accordingly, the network operations are representative of any set of operations that the UE may activate or deactivate based on the operating mode that is being used.

It is also noted that the exemplary embodiments are described to include scenarios in which the UE is an accessory UE. In such a scenario, the accessory UE and a companion source UE may establish a short-range communication pathway (e.g., where the accessory UE is a slave and the source UE is a master). Accordingly, when the accessory UE and the source UE are connected over the short-range communication pathway, in one manner, the accessory UE may receive data via the source UE while deactivating any network capabilities to a cellular network and/or a WiFi network. In another manner, the accessory UE may maintain network capabilities even when the accessory UE and the source UE are connected over the short-range communication pathway. When the accessory UE and the source UE are not connected, the accessory UE may exchange data over any network to which it is configured to connect (instead of through the source UE). However, the use of the accessory UE and the source UE is only exemplary. The exemplary embodiments may be utilized for any UE (with or without a companion UE) and represent any device.

The exemplary embodiments are also described with regard to various temperature readings in Celsius. Those skilled in the art will understand the various other temperature standards that may be converted from the values used herein. It is noted that the values described herein with regard to the exemplary embodiments is only exemplary. The exemplary embodiments may utilize different temperature values as long as an ordering in quantity and/or degree of separation is maintained. It is also noted that the use of temperature is only exemplary. The exemplary embodiments may also be utilized with any other basis upon which a restricted mode may be implemented between two operating modes (e.g., moisture content).

A UE may provide a plurality of different features including corresponding applications and hardware, software, and/or firmware. When using these various features, the UE components may draw a significant amount of power. For example, these components may be a baseband chip (e.g., a cellular chip), a global positioning system (GPS) component, an applications processor, etc. When used, these components may drain a battery of the UE. In fact, with the advent of further features, the UE may include additional power drawing components. For example, a further feature may utilize extra sensors related to monitoring a health of the user (e.g., heart rate monitoring). These components drawing power may cause the UE to heat up. Therefore, the UE may be equipped with one or more functionalities directed to prevent the UE from being heated up excessively.

The optimizations may be configured in various ways and affect different hardware, software, and/or firmware. For example, one particular functionality that the UE may utilize is setting an operating mode to a brick mode. In the brick mode, the network operations that the UE is capable of performing and corresponding components (e.g., the baseband chip, a transceiver, etc.) may be completely shut down when the temperature of the UE exceeds a brick threshold. The brick mode may also disable any user interaction. For example, the brick threshold may be 41° C. The UE may exit the brick mode and reactivate the network operations and the corresponding components when the temperature of the UE is measured to reach an acceptable threshold such as less than 38° C.

Although the brick mode functionality may prevent damage to the UE and its components caused by overheating as well as preventing the UE from hurting the user (e.g., avoid the UE reaching an external temperature that may burn the user), this functionality deactivates the network operations until the temperature of the UE reaches the acceptable threshold. Therefore, the network operations are inaccessible for the duration that the brick mode is being used. For example, emergency calls or other contacting operations that require the network operations may be unavailable to the user. In another example, broadcast alerts (e.g., Commercial Mobile Alert System (CMAS), Earthquake and Tsunami Warning System (ETWS), etc.) may not be received in brick mode.

Furthermore, the brick mode functionality only uses as its input the temperature of the UE. That is, the brick mode functionality uses an on/off protocol where any temperature reading under the brick threshold does not initiate the brick mode while any temperature reading of at least the brick threshold initiates the brick mode. Thus, the UE allows all operations including network operations to be used and once the brick threshold is measured, the brick mode activates and the network operations are stopped. However, there may be other considerations that affect the temperature of the UE including environmental factors such as environmental temperature, humidity, barometric pressure, etc. In certain tropical locations (e.g., Southeast Asia) and desert locations (e.g., Middle East), the temperature and/or humidity may be substantially high which contributes to the temperature of the UE rising. With certain combinations of high environment temperature and humidity, the temperature of the UE may reach the brick threshold with even minimal use of the network operations (e.g., through only background network operations).

In view of the manner of selecting only between a standard mode and the brick mode in conventional schemes, the exemplary embodiments utilize, in addition to the standard mode and the brick mode, a TRM which is an intermediate mode that selectively deactivates or modifies certain operations of the UE in an attempt to prevent the temperature of the UE rising further so that brick mode is not reached. As will be described in further detail below, the mechanism according to the exemplary embodiments may utilize available information relating to the temperature of the UE, the disposition of the UE, and local environmental conditions to identify whether to utilize the TRM as well as which form of the TRM to use. The TRM may include a plurality of different modes that increasingly deactivates or modifies operations. The different modes may include a regular TRM, an enhanced TRM, a further enhanced TRM, and a critical TRM, each of which will be described below.

Figure 1:
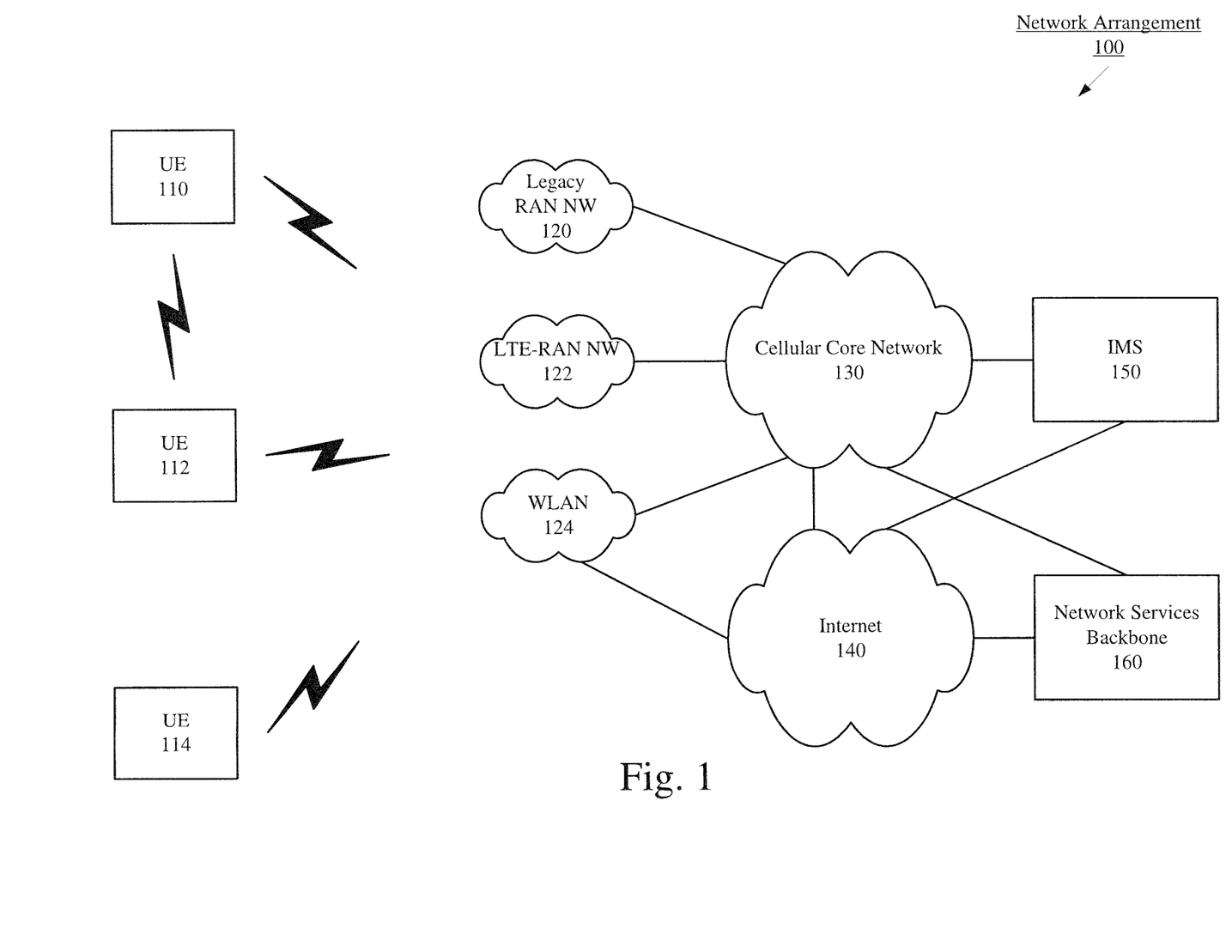
FIG. 1 shows an example network arrangement according to various exemplary embodiments described herein.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network, a WCDMA network, a UMTS network, etc.), a LTE RAN (LTE-RAN) 122, and a wireless local area network (WLAN) 124 (e.g., a WiFi network). However, it should be understood that the UEs 110-114 may also communicate with other types of networks (e.g., 5G networks, etc.). With regards to the exemplary embodiments, in a particular implementation, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is an accessory device and the UE 112 is a source device. In a further implementation, the UE 110 as the accessory device may be a slave while the UE 112 as the source device may be a master. Thus, in one manner, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. In another manner, the UEs 110, 112 may be configured to connect to any of the networks 120-124 as well as to each other. However, it is again noted that the use of a companion relationship is only exemplary and the UE 110 may connect to one or more of the networks 120-124 whether or not the UE 110 is within range of communicating with the UE 112 over the short-range communication pathway. With regard to use of the short-range communication pathway, the exemplary embodiments may include features for both scenarios where the UE 110 may establish a connection to one of the networks 120-124 and to the UE 112 or where the UE 110 may only establish a connection to the UE 112.

As noted above, the exemplary embodiments are described with regard to operations being deactivated or modified where the operations include network operations. Thus, the exemplary embodiments may be implemented when the UE 110 has established a connection to at least one of the networks 120-124. However, also noted above, the operations including network operations is only exemplary and other operations (e.g., entirely internal operations not utilizing the network connection) may also be deactivated or modified. Thus, the exemplary embodiments may be modified to be implemented when the UE 110 is not connected to any of the networks 120-124 and/or when the UE 110 is connected to the UE 112 only.

The legacy RAN 120 and the LTE-RAN 122 are portions of cellular networks that may be deployed by cellular providers. The WLAN 124 may include any type of wireless local area network (e.g., WiFi, Hot Spot, IEEE 802.11x networks, etc.). In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The exemplary embodiments relate to the UE 110 determining an operating mode to use based on conditions of the UE 110 that affect the temperature of the UE 110. Thus, while the UE 110 has a temperature below a first threshold (to be described below), a standard mode may be used; while the UE 110 has a temperature above the brick threshold (which is greater than the first threshold), a brick mode may be used; and while the UE 110 has a temperature between the first threshold and the brick threshold, the TRM may be used.

Figure 2:
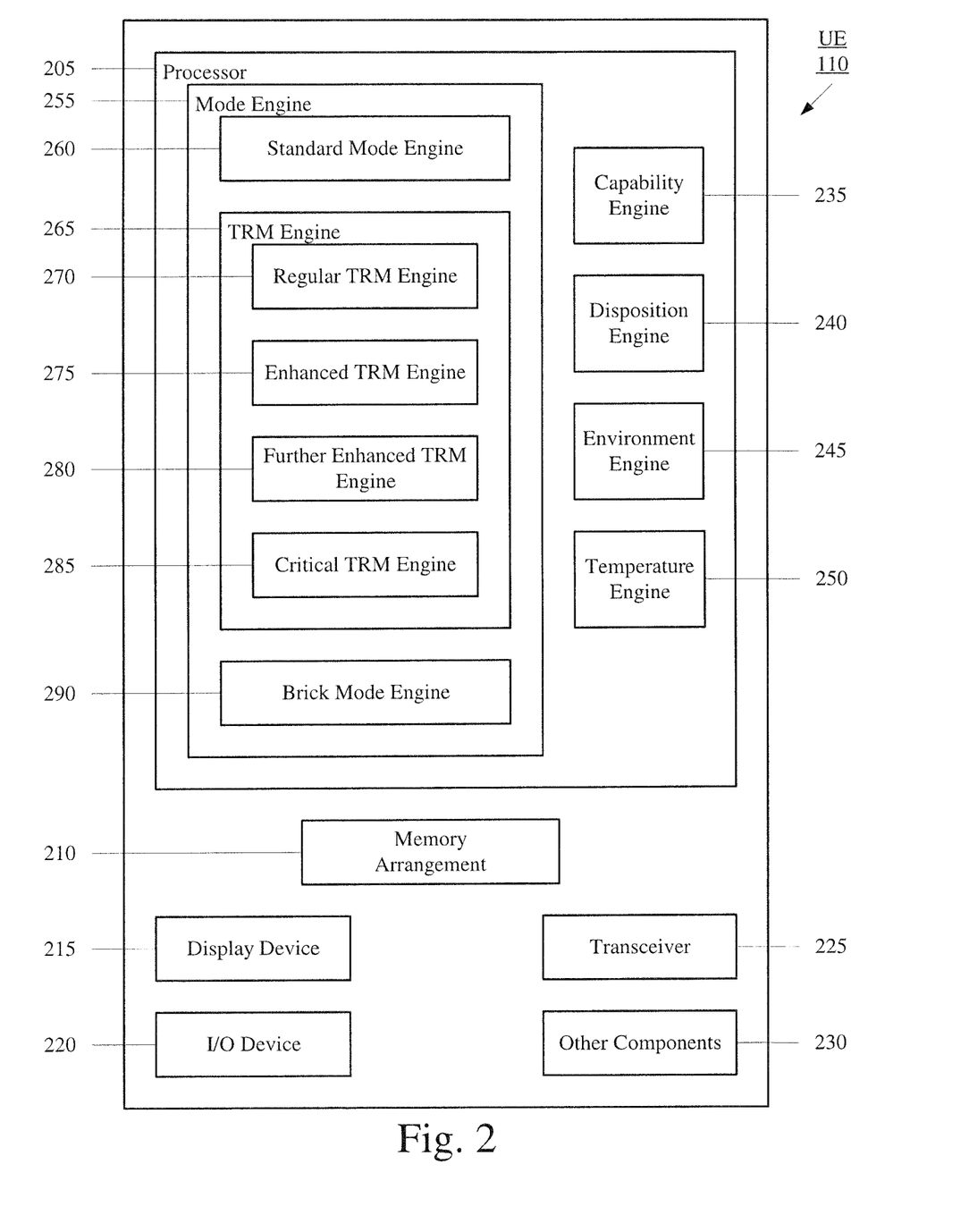
FIG. 2 shows an example user equipment according to various exemplary embodiments described herein.

FIG. 2 shows the UE 110 of the network arrangement 100 of FIG. 1 according to the exemplary embodiments. The UE 110 is configured to execute a plurality of engines that perform functionalities to select the operating mode to be used. It is noted that the UE 110 being configured with the features of the exemplary embodiments is only exemplary. That is, the UE 110 may also represent the UEs 112, 114.

The UE 110 may represent any electronic device that is configured to utilize the mechanism according to the exemplary embodiments and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, heat sensors, etc.

The processor 205 may be configured to execute a plurality of engines of the UE 110. For example, the engines may include a capability engine 235, a disposition engine 240, an environment engine 245, a temperature engine 250, and a mode engine 255. The capability engine 235 may be configured to determine whether a monitoring functionality is present or activated on the UE 110. The disposition engine 240 may be configured to determine a relative disposition (or location) of the UE 110 as to whether the UE 110 is exposed to environmental conditions. The environment engine 245 may be configured to identify or determine environmental conditions at a location of the UE 110. The temperature engine 250 may be configured to determine a temperature of the UE 110. The mode engine 255 may be configured to receive the outputs of the engines 235-250 and select an operating mode to be used.

It should be noted that the above noted engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a connection with the legacy RAN 120, the LTE-RAN 122, the WLAN 124, the UE 112, etc. Accordingly, the transceiver 225 may operate on a variety of different frequencies or channels (e.g., set of consecutive frequencies).

The exemplary embodiments are configured to take into account the environmental factors as well as information about sensors active in the UE 110 to minimize the instances of the UE 110 utilizing the brick mode, particularly in locations prone to increased environment temperature and/or environment humidity while the UE 110 is exposed to these environmental conditions. The exemplary embodiments further provide the TRM that systematically and in a step-wise manner allows and prevents corresponding select operations from being used to prevent the temperature of the UE 110 from rising to the brick threshold associated with using the brick mode. Using the outputs of the engines 235-250, the exemplary embodiments may estimate when the UE 110 is likely to use the brick mode. Depending on this time, the exemplary embodiments may alter the performance of the select operations and the corresponding components to prolong the time that the UE 110 remains in the TRM before being forced to the brick mode.

As described above, the capability engine 235 may determine whether a monitoring functionality is present or activated on the UE 110. The other components 230 may include sensors or be configured to connect to sensors that monitor vital statistics of the user of the UE 110. For example, when the UE 110 is a wearable or has components that may be attached to the user (e.g., leads), the sensors may monitor vital statistics of the user such as a temperature, a heart rate, a blood pressure, etc. The monitoring functionality may monitor the vital statistics continuously while the UE 110 is activated and has access to the user. While the monitoring functionality and the corresponding components (e.g., sensors, a separate processing chip, etc.) are being used, there may be an additional contribution to heat generation that affects the temperature of the UE 110. Accordingly, the capability engine 235 may determine whether the monitoring functionality is available on the UE 110 and whether the monitoring functionality is being used while the mechanism according to the exemplary embodiments is being used. As will be described in further detail below, based on the output of the capability engine 235, the mechanism according to the exemplary embodiments may be modified in execution.

The disposition engine 240 may determine a relative disposition of the UE 110 as to whether the UE 110 is exposed to environmental conditions. For example, the disposition engine 240 may determine whether the UE 110 is indoors or outdoors. Those skilled in the art will understand that, generally, indoor conditions may not be as harsh as outdoor environmental conditions, particularly in the above noted locations (e.g., tropical or desert areas). Thus, continuous exposure to environmental conditions may affect the temperature of the UE 110, especially when the environmental conditions include high temperature and/or high humidity. In determining whether the UE 110 is indoors or outdoors, the other components 230 may include a GPS chip (e.g., depending on how many satellites are visible) or sensors that are capable of determining the disposition of the UE 110. The UE 110 may also utilize the transceiver 225 to receive an indication as to whether the UE 110 is indoors or outdoors. While the UE 110 is located outdoors, there may be additional considerations in determining the temperature of the UE 110. Accordingly, the disposition engine 240 may determine whether the UE 110 is outdoors. As will be described in further detail below, based on the output of the disposition engine 240, the mechanism according to the exemplary embodiments may be implemented or bypassed.

For illustrative purposes, when the disposition engine 240 determines that the UE 110 is indoors, the exemplary embodiments may be bypassed. However, such a setting or use of the exemplary embodiments is only exemplary. In another exemplary implementation, the UE 110 may be configured to utilize the exemplary embodiments regardless of the location. For example, when the UE 110 is in an indoor location that simulates the tropical or desert areas (e.g., sauna), the exemplary embodiments may still be implemented.

The environment engine 245 may identify or determine environmental conditions at a location of the UE 110. For example, the environment engine 245 may determine the weather of the location including temperature, humidity, barometric pressure, etc. In determining the environmental conditions, the other components 230 may include sensors that are capable of measuring environmental parameters. The UE 110 may also utilize the transceiver 225 to receive information associated with the environmental conditions. Those skilled in the art will understand that the environmental conditions may affect how a user may experience the weather. For example, a thermometer may read the temperature of the location as 32° C. However, the location may have a humidity of 61% which leads a user to experience the weather as if the temperature is 37° C. Although the artificial increase in experiencing the temperature may not apply to the UE 110, the environmental conditions may provide insight as to whether the temperature of the UE 110 is likely to increase. As noted above, the exemplary embodiments have an objective of avoiding use of the brick mode by preventing the UE 110 from reaching the brick threshold. Thus, when the environment engine 245 identifies environmental conditions that are indicative of the temperature increasing or "feeling" more than a simple temperature reading, the environment engine 245 may determine that the environmental conditions may augment the temperature of the UE 110. Accordingly, the environment engine 245 may determine the environmental conditions at the location of the UE 110 and whether these environmental conditions (as a combination) augments the temperature of the UE 110. As will be described in further detail below, based on the output of the environment engine 245, the mechanism according to the exemplary embodiments may be implemented or bypassed.

For illustrative purposes, when the environment engine 245 determines that the environmental conditions do not augment the temperature of the UE 110, the exemplary embodiments may be bypassed. For example, a low temperature and/or a low humidity may correspond to feeling the environment temperature as the measured value. Therefore, it may be unlikely that the UE 110 increases in temperature to a degree that requires the TRM or the brick mode unless further influences are applied. However, such a setting or use of the exemplary embodiments is only exemplary. In another exemplary implementation, the UE 110 may be configured to utilize the exemplary embodiments regardless of the environmental conditions. For example, the mechanism according to the exemplary embodiments may also consider the further influences.

While the monitoring functionality and the corresponding components (e.g., sensors, a separate processing chip, etc.) are being used, there may be an additional contribution to heat generation that affects the temperature of the UE 110. Accordingly, the capability engine 235 may determine whether the monitoring functionality is available on the UE 110 and whether the monitoring functionality is being used while the mechanism according to the exemplary embodiments is being used. As will be described in further detail below, based on the output of the capability engine 235, the mechanism according to the exemplary embodiments may be modified in execution.

The temperature engine 250 may determine a temperature of the UE 110. As described above, the mechanism according to the exemplary embodiments may set an operating mode based on the temperature of the UE 110. Accordingly, the output of the temperature engine 250 may identify the proper operating mode that is to be used from the standard mode, the TRM, and the brick mode. In determining the temperature of the UE 110, the other components 230 may include sensors that are capable of measuring the internal temperature of the UE 110 and/or heat generation of the components as well as from exterior influences (e.g., contact with the user). For example, the sensors may include a circuit board thermometer, a battery thermometer, thermocouples, resistance temperature detectors (RTPs), etc.

The mode engine 255 may be configured to receive the outputs of the engines 235-250 and select an operating mode to be used. As noted above, the capability engine 235 may identify how the mode engine 255 is to be used, particularly the TRM while the disposition engine 240 and the environment engine 245 may individually identify whether the standard mode or the TRM is to be used. The mode engine 255 may be configured to set the operating mode from a plurality of different operating modes. The operating modes may include the standard mode, the brick mode, and the TRM. The standard mode may be set with a standard mode engine 260; the brick mode may be set with a brick mode engine 290; and the TRM may be set with a TRM engine 265.

The standard mode may correspond to an operating mode where select operations may be performed in an ordinary manner (e.g., being available without modification). As will be described in further detail below, the select operations may include network operations and the monitoring functionality (if available and/or being used). The brick mode may correspond to an operating mode where the network operations and the corresponding components (e.g., transceiver 225, other radios, baseband processor, etc.) are deactivated. The TRM may correspond to an operating mode in between the standard mode and the brick mode where the select operations are systematically modified or deactivated to prevent the UE 110 from using the brick mode. As will become apparent below, the TRM may be a state where the UE 110 performance is systematically degraded to prevent the temperature of the UE 110 from increasing drastically (e.g., from continued use of network operations over a period of time).

The TRM as provided via the TRM engine 265 may include a plurality of different operating modes. Specifically, the TRM may include a regular TRM (as provided via a regular TRM engine 270), an enhanced TRM (as provided via an enhanced TRM engine 275), a further enhanced TRM (as provided via a further enhanced TRM engine 280), and a critical TRM (as provided via a critical TRM engine 285). It is noted that the TRM may utilize one or more of these TRM operating modes and the exemplary embodiments are not required to utilize all or any available TRM operating mode as described in an exemplary implementation below. It is also noted that the TRM may be modified to include further TRM operating modes before the regular TRM, after the critical TRM, or between any of the above noted TRM operating modes.

Each of the TRM operating modes may be configured to deactivate or modify an operation being performed by the UE 110. By deactivating or modifying the select operations (e.g., known to contribute to heat generation), the exemplary embodiments may attempt to arrest any further rise in temperature of the UE 110 or prevent the brick mode from being used. The exemplary embodiments are described below where each TRM operating mode has a setting that is applied to settings that are previously instituted. For example, when the further enhanced TRM is used, the regular TRM and the enhanced TRM may have already been used. Thus, the further enhanced TRM may have settings which are added to the settings that are instituted by the regular TRM and the enhanced TRM. However, such an implementation is only exemplary and each TRM operating mode may be performed in an individual capacity where each TRM has a setting that include settings from previous TRM operating modes.

The regular TRM may be an initial TRM operating mode. The regular TRM may be used when the mode engine 255 receives the output from the temperature engine 250 (as well as the proper outputs from the other engines 235-245) indicating that the temperature of the UE 110 has reached the first threshold. Accordingly, while the UE 110 has a temperature that is under the first threshold, the UE 110 may utilize the standard mode. However, when the UE 110 has reached a temperature that is at least the first threshold, the UE 110 may use the regular TRM. As noted above, the capability engine 235 may indicate whether a monitoring functionality is available and/or in use and that the output of the capability engine 235 may define the manner in which the TRM is implemented. In a first example, when the monitoring functionality is available and in use, the first threshold may be set to 34° C. In a second example, when the monitoring functionality is unavailable or not in use, the first threshold may be set to 36° C.

The regular TRM may be configured to throttle background data that is not initiated by the user. For example, the background data may be a background stock application that refreshes stock ticker traffic at predetermined time intervals. This background stock application refresh may be blocked by the regular TRM. The regular TRM may perform this throttling in a variety of ways. For example, a link quality metric (LQM) Abort may be indicated to the applications processor. By throttling background data, the regular TRM may reduce the transmission activity over the cellular baseband with little to no user impact.

The enhanced TRM may be a second TRM operating mode. The enhanced TRM may be used when the mode engine 255 receives the output from the temperature engine 250 (as well as the proper outputs from the other engines 235-245) indicating that the temperature of the UE 110 has reached a second threshold. Accordingly, while the UE 110 has a temperature that is under the second threshold but above the first threshold, the UE 110 may utilize the regular TRM. However, when the UE 110 has reached a temperature that is at least the second threshold, the UE 110 may use the enhanced TRM. As noted above, the capability engine 235 may indicate whether a monitoring functionality is available and/or in use and that the output of the capability engine 235 may define the manner in which the TRM is implemented. In a first example, when the monitoring functionality is available and in use, the second threshold may be set to 36° C. In a second example, when the monitoring functionality is unavailable or not in use, the second threshold may be set to 38° C.

The enhanced TRM may be configured to use a plurality of settings. These settings may be used individually or as a combination. In a first example, the enhanced TRM may disable carrier aggregation if this feature has been enabled on the UE 110. As those skilled in the art will understand, carrier aggregation may cause multiple RF transceivers to be active at the same time, thereby causing higher heat dissipation as well as battery drain. By disabling carrier aggregation, the enhanced TRM may reduce the use of multiple transceivers while retaining the capability of exchanging data over a network (e.g., LTE-RAN 122). In a second example, the enhanced TRM may determine when the UE 110 is out of service or has limited service and subsequently scan less frequently (to return to full service) while the UE 110 is substantially stationary. When the UE 110 is out of cellular service or in limited service, scanning less frequently for full service may aid in keeping the device in a sleep state for a longer period of time, thereby helping reduce a rate of temperature increase. Also, when the UE 110 is stationary, it is unlikely that scanning more often will help in finding better service.

The further enhanced TRM may be a third TRM operating mode. The further enhanced TRM may be used when the mode engine 255 receives the output from the temperature engine 250 (as well as the proper outputs from the other engines 235-245) indicating that the temperature of the UE 110 has reached a third threshold. Accordingly, while the UE 110 has a temperature that is under the third threshold but above the second threshold, the UE 110 may utilize the enhanced TRM. However, when the UE 110 has reached a temperature that is at least the third threshold, the UE 110 may use the further enhanced TRM. As noted above, the capability engine 235 may indicate whether a monitoring functionality is available and/or in use and that the output of the capability engine 235 may define the manner in which the TRM is implemented. In a first example, when the monitoring functionality is available and in use, the third threshold may be set to 38° C. In a second example, when the monitoring functionality is unavailable or not in use, the third threshold may be set to 40° C.

The further enhanced TRM may also be configured to use a plurality of settings. These settings may be used individually or as a combination. In a first example, the further enhanced TRM may extend the idle mode discontinuous reception (DRX) cycle. For example, a typical DRX cycle may be configured for 1.28 seconds. The further enhanced TRM may extend the idle mode DRX cycle to 2.56 seconds although other values may also be used. By extending the idle mode DRX cycle, the UE 110 may wake up less often to decode pages and reduce idle mode power draw significantly. For example, over a 24-hour period, battery life may be increased by approximately 45 minutes to 60 minutes. Although page reception may be delayed, networks are typically configured to retry paging such that the UE 110 is likely to receive the page during a retransmission by the network. In reducing the times the UE 110 is woken up and the corresponding operations, the heat generated therefrom may be reduced. In a second example, the further enhanced TRM may reduce a baseband clock speed. For example, a typical performance mode clock speed may be 499 MHz. The further enhanced TRM may reduce the clock speed to a nominal mode of 345 MHz. Since carrier aggregation and other high throughput features may already be disabled (e.g., from the enhanced TRM), reducing the baseband clock speed may help sustain regular applications like voice calls while at the same time reducing power consumption. In reducing the baseband clock speed, the heat generated from using the performance mode baseband clock speed may be reduced.

The critical TRM may be a fourth TRM operating mode. The critical TRM may be used when the mode engine 255 receives the output from the temperature engine 250 (as well as the proper outputs from the other engines 235-245) indicating that the temperature of the UE 110 has reached a fourth threshold. As noted above, the capability engine 235 may indicate whether a monitoring functionality is available and/or in use and that the output of the capability engine 235 may define the manner in which the TRM is implemented. The critical TRM may be used only when the monitoring functionality is available and in use. Accordingly, while the UE 110 has a temperature that is under the fourth threshold but above the third threshold (set at 38° C.), the UE 110 may utilize the critical TRM. However, when the UE 110 has reached a temperature that is at least the fourth threshold, the UE 110 may use the critical TRM. Thus, for example, the fourth threshold may be set to 40° C.

The critical TRM may be configured to reduce the frequency of measuring vital statistics of the user by the monitoring functionality. As the monitoring functionality may have a relatively high priority in remaining active while the UE 110 is in use, the monitoring functionality being throttled may be a last stage setting. In reducing the frequency with which the monitoring functionality is used, the temperature rise of the UE 110 may be curtailed. Also, by remaining out of brick mode, the user may still be allowed to use emergency contact services if needed.

Even if using the critical TRM, the temperature of the UE 110 reaches the brick threshold, the mode engine 255 may use the brick mode. Accordingly, while the UE 110 has a temperature that is under the brick threshold but above the fourth (or third) predetermined threshold, the UE 110 may utilize the critical (or further enhanced) TRM. However, when the UE 110 has reached a temperature that is at least the brick threshold, the UE 110 may use the brick TRM. Again, the brick threshold may be set to 41° C. By deactivating the network operations and the corresponding components, when the UE 110 has a temperature that measures less than an acceptable threshold (e.g., sixth threshold) such as 38° C., the UE 110 may return to using the standard mode and the mechanism according to the exemplary embodiments may be used.

The exemplary embodiments provide a mechanism that prevents or delays the UE 110 from using the brick mode where network operations and corresponding components are deactivated and unavailable for use by the user. In providing this feature, the exemplary embodiments utilize an intermediate operating mode between a standard mode and the brick mode. The intermediate operating mode may be a TRM in which a plurality of thresholds are used to institute respective settings, use of any setting incorporating the settings of one or more previous settings. Thus, a first threshold may determine whether the standard mode is used or a regular TRM is used; a second threshold may determine whether the regular TRM is used or an enhanced TRM is used; a third threshold may determine whether the enhanced TRM is used or a further enhanced TRM is used; a fourth threshold may determine whether the further enhanced TRM is used or a critical TRM is used; and a fifth threshold may determine whether the critical TRM is used or a brick mode is used. Once the UE 110 uses the brick mode, there may be a sixth threshold that determines when the UE 110 exits the brick mode and uses the standard mode.

Figure 3:
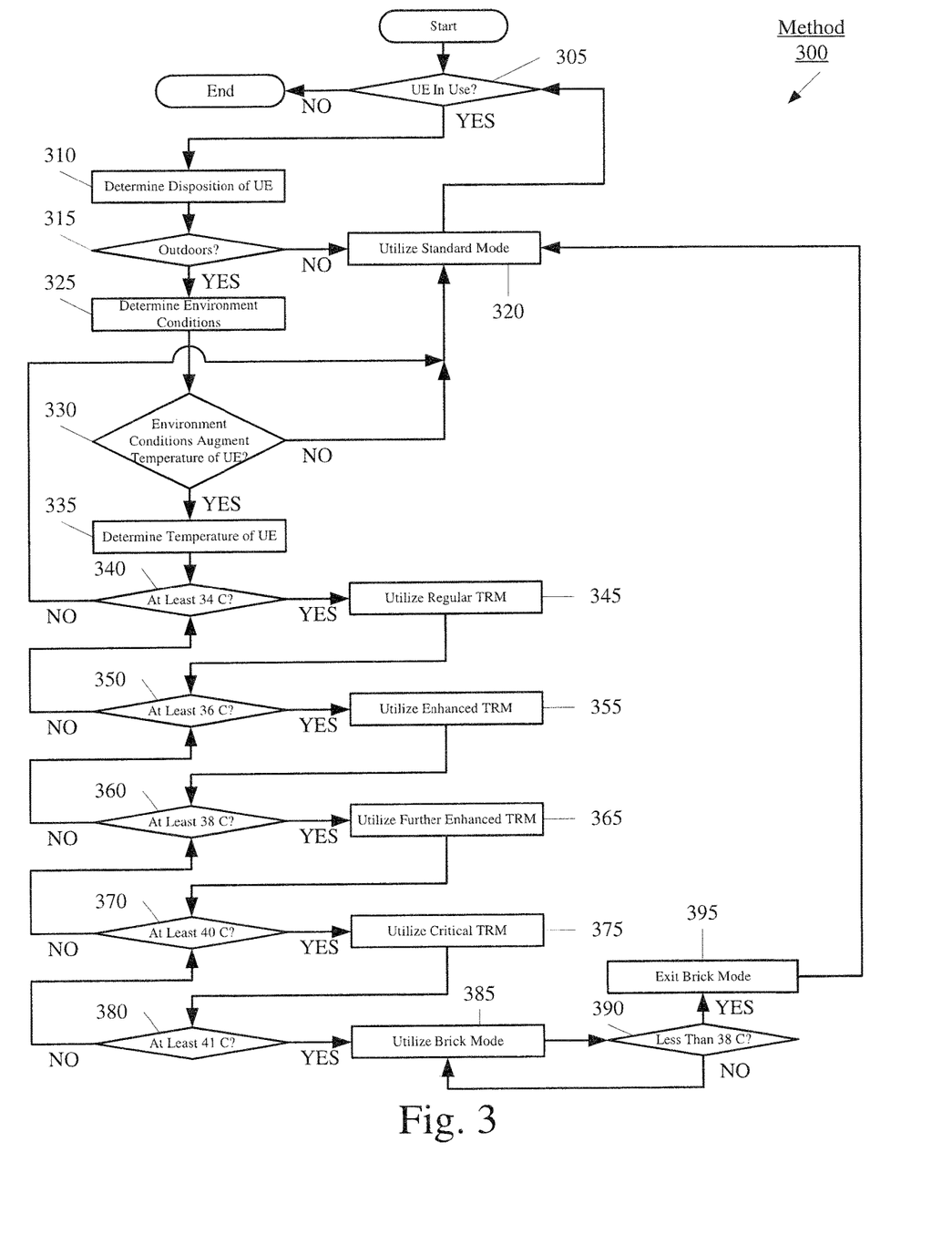
FIG. 3 shows a first exemplary method for utilizing a temperature restricted mode according to various exemplary embodiments described herein.

FIG. 3 shows a first exemplary method 300 for utilizing a TRM according to various exemplary embodiments described herein. The TRM may be an intermediate operating mode used between a standard mode where select operations are allowed to be used without modification and a brick mode where the select operations are deactivated. Thus, the method 300 is configured to utilize the TRM to prevent or delay the UE 110 from using the brick mode and enable the select operations or modified versions of the select operations to be used. The method 300 may relate to when a monitoring functionality is available and in use. The method 300 will be described with regard to the network arrangement 100 of FIG. 1 and the UE 110 of FIG. 2.

Figure 4:
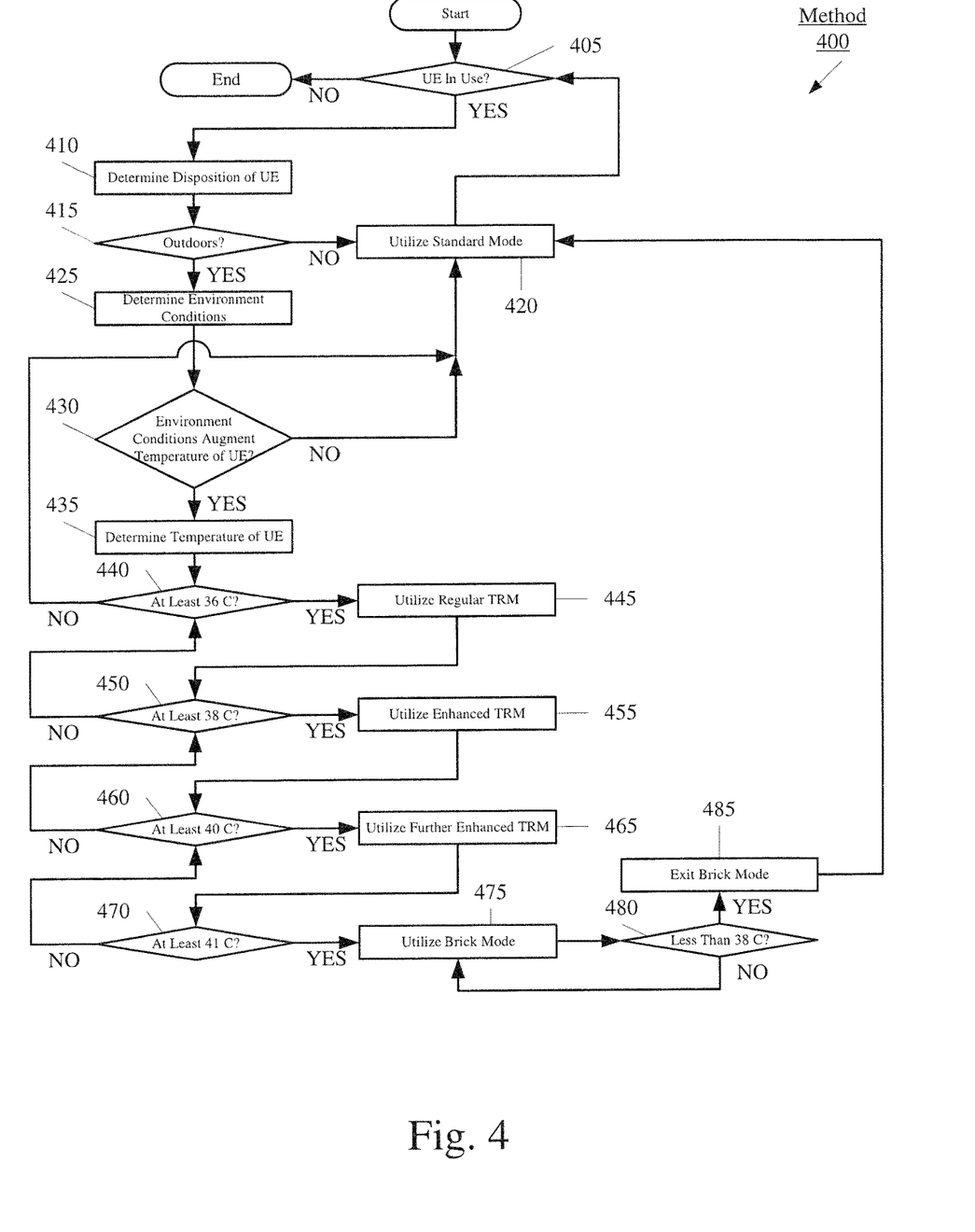
FIG. 4 shows a second exemplary method for utilizing a temperature restricted mode according to various exemplary embodiments described herein.

As will be described below, FIG. 4 illustrates a method 400 in which the monitoring functionality is unavailable and not in use. Thus, the methods 300 and 400 may be incorporated into an overall method. The overall method may incorporate a determination as to whether the monitoring functionality is being used (as determined with the capability engine 235). Based on this determination, the overall method may branch into the respective steps of the method 300 when the monitoring functionality is available and in use or the method 400 when the monitoring functionality is unavailable or not in use. However, for illustrative purposes, the methods 300 and 400 are described separately.

In 305, the UE 110 determines whether the UE 110 is in use. While the UE 110 is in use, the operating mode may be determined and used. Thus, in 310, the UE 110 may determine a location of the UE 110. The disposition engine 240 may determine whether the UE 110 is exposed to environmental conditions. For example, the UE 110 may determine whether the UE 110 is indoors or outdoors. As noted above, if the UE 110 is indoors, the UE 110 may not be likely to experience a drastic increase in temperature. In 315, the UE 110 determines whether the UE 110 is outdoors. If indoors, the UE 110 continues to 320 where a standard mode in which select operations are allowed is used. However, if outdoors, the UE 110 continues to 325.

In 325, the UE 110 may determine environmental conditions of the location. The environment engine 245 may determine whether the environmental conditions that are present may affect the temperature of the UE 110. As noted above, certain environmental conditions such as high temperature and/or high humidity may augment the temperature of the UE 110. In 330, the UE 110 determines whether the environmental conditions augment the temperature of the UE 110. If the environmental conditions do not augment the temperature of the UE 110, the UE 110 continues to 320 where the standard mode is used. However, if the environmental conditions augment the temperature of the UE 110, the UE 110 continues to 335.

In 335, the UE 110 determines the temperature of the UE 110 using the temperature engine 250. In 340, the UE 110 determines if the temperature of the UE 110 is at least a first threshold of 34° C. As noted above, the first threshold may be a first determination as to whether the standard mode is to be used or the regular TRM is to be used. Thus, if the temperature is less than 34° C., the UE 110 continues to 320 where the standard mode is used. However, if the temperature is at least 34° C., the UE 110 continues to 345 where the regular TRM is used. As noted above, the regular TRM may entail throttling background data not initiated by the user.

In 350, the UE 110 determines if the temperature of the UE 110 is at least a second threshold of 36° C. As noted above, the second threshold may be a second determination as to whether the regular TRM is to be used or the enhanced TRM is to be used. Thus, if the temperature is less than 36° C. but above 34° C., the UE 110 returns to 340 where the regular TRM is used. However, if the temperature is at least 36° C., the UE 110 continues to 355 where the enhanced TRM is used. As noted above, the enhanced TRM may entail disabling carrier aggregation and/or scanning to return to full service less frequently when out of service or in limited service.

In 360, the UE 110 determines if the temperature of the UE 110 is at least a third threshold of 38° C. As noted above, the third threshold may be a third determination as to whether the enhanced TRM is to be used or the further enhanced TRM is to be used. Thus, if the temperature is less than 38° C. but above 36° C., the UE 110 returns to 350 where the enhanced TRM is used. However, if the temperature is at least 38° C., the UE 110 continues to 365 where the further enhanced TRM is used. As noted above, the further enhanced TRM may entail extending the idle mode DRX cycle and/or reducing a baseband clock speed.

In 370, the UE 110 determines if the temperature of the UE 110 is at least a fourth threshold of 40° C. As noted above, the fourth threshold may be a fourth determination as to whether the further enhanced TRM is to be used or the critical TRM is to be used. Thus, if the temperature is less than 40° C. but above 38° C., the UE 110 returns to 360 where the further enhanced TRM is used. However, if the temperature is at least 40° C., the UE 110 continues to 375 where the critical TRM is used. As noted above, the critical TRM may entail reducing a frequency with which a monitoring functionality is used.

In 380, the UE 110 determines if the temperature of the UE 110 is at least a brick threshold of 41° C. As noted above, the brick threshold may be a fifth determination as to whether the critical TRM is to be used or the brick mode is to be used. Thus, if the temperature is less than 41° C. but above 40° C., the UE 110 returns to 370 where the critical TRM is used. However, if the temperature is at least 41° C., the UE 110 continues to 385 where the brick mode is used. As noted above, the brick mode may entail deactivating network operations and corresponding components. It is noted that the brick mode may resume the monitoring functionality at the standard frequency. However, the monitoring functionality may remain at a reduced frequency to quicken the rate at which the temperature of the UE 110 is reduced.

In 390, the UE 110 determines if the temperature of the UE 110 has lowered to an acceptable threshold of 38° C. As noted above, the acceptable threshold may be a sixth determination used when the UE 110 is in the brick mode so that the UE 110 may subsequently exit using the brick mode. Thus, if the temperature is more than 38° C., the UE 110 returns to 385 and the brick mode is continued. However, if the temperature is no more than 38° C., the UE 110 continues to 395 where the brick mode is exited and subsequently returns to 320 where the standard mode is used.

It is noted that returning to 320 after 395 is only exemplary. Since the UE 110 is likely to have reached 38° C. and not below the first threshold of 34° C., the UE 110 may instead return to 360 where the third threshold is set to 38° C. In this manner, the UE 110 may immediately utilize the TRM to further reduce the temperature of the UE 110 and return to standard mode in a more efficient manner.

FIG. 4 shows a second exemplary method 400 for utilizing a TRM according to various exemplary embodiments described herein. Again, the TRM may be an intermediate operating mode used between a standard mode where select operations are allowed to be used without modification and a brick mode where the select operations are deactivated. Thus, the method 400 is configured to utilize the TRM to prevent or delay the UE 110 from using the brick mode and enable the select operations or modified versions of the select operations from being used. The method 400 may relate to when a monitoring functionality is unavailable or not in use. The method 400 will be described with regard to the network arrangement 100 of FIG. 1 and the UE 110 of FIG. 2.

In 405, the UE 110 determines whether the UE 110 is in use. While the UE 110 is in use, the operating mode may be determined and used. Thus, in 410, the UE 110 may determine a location of the UE 110. The disposition engine 240 may determine whether the UE 110 is exposed to environmental conditions. For example, the UE 110 may determine whether the UE 110 is indoors or outdoors. As noted above, if the UE 110 is indoors, the UE 110 may not be likely to experience a drastic increase in temperature. In 415, the UE 110 determines whether the UE 110 is outdoors. If indoors, the UE 110 continues to 420 where a standard mode in which select operations are allowed is used. However, if outdoors, the UE 110 continues to 425.

In 425, the UE 110 may determine environmental conditions of the location. The environment engine 245 may determine whether the environmental conditions that are present may affect the temperature of the UE 110. As noted above, certain environmental conditions such as high temperature and/or high humidity may augment the temperature of the UE 110. In 430, the UE 110 determines whether the environmental conditions augment the temperature of the UE 110. If the environmental conditions do not augment the temperature of the UE 110, the UE 110 continues to 420 where the standard mode is used. However, if the environmental conditions augment the temperature of the UE 110, the UE 110 continues to 435.

In 435, the UE 110 determines the temperature of the UE 110 using the temperature engine 250. In 440, the UE 110 determines if the temperature of the UE 110 is at least a first threshold of 36° C. As noted above, the first threshold may be a first determination as to whether the standard mode is to be used or the regular TRM is to be used. In contrast to the method 300, the first threshold of the method 400 may be shifted to compensate for excluding the critical TRM. Thus, if the temperature is less than 36° C., the UE 110 continues to 420 where the standard mode is used. However, if the temperature is at least 36° C., the UE 110 continues to 445 where the regular TRM is used. As noted above, the regular TRM may entail throttling background data not initiated by the user.

In 450, the UE 110 determines if the temperature of the UE 110 is at least a second threshold of 38° C. As noted above, the second threshold may be a second determination as to whether the regular TRM is to be used or the enhanced TRM is to be used. Again, to compensate for excluding the critical TRM, the second threshold may be shifted. Thus, if the temperature is less than 38° C. but above 36° C., the UE 110 returns to 440 where the regular TRM is used. However, if the temperature is at least 38° C., the UE 110 continues to 455 where the enhanced TRM is used. As noted above, the enhanced TRM may entail disabling carrier aggregation and/or scanning to return to full service less frequently when out of service or in limited service.

In 460, the UE 110 determines if the temperature of the UE 110 is at least a third threshold of 40° C. As noted above, the third threshold may be a third determination as to whether the enhanced TRM is to be used or the further enhanced TRM is to be used. Again, to compensate for excluding the critical TRM, the third threshold may be shifted. Thus, if the temperature is less than 40° C. but above 38° C., the UE 110 returns to 450 where the enhanced TRM is used. However, if the temperature is at least 40° C., the UE 110 continues to 465 where the further enhanced TRM is used. As noted above, the further enhanced TRM may entail extending the idle mode DRX cycle and/or reducing a baseband clock speed.

In 470, the UE 110 determines if the temperature of the UE 110 is at least a brick threshold of 41° C. As noted above, the brick threshold may be a fourth determination in the method 400 as to whether the further enhanced TRM is to be used or the brick mode is to be used. Thus, if the temperature is less than 41° C. but above 40° C., the UE 110 returns to 460 where the further enhanced TRM is used. However, if the temperature is at least 41° C., the UE 110 continues to 475 where the brick mode is used. As noted above, the brick mode may entail deactivating network operations and corresponding components. It is noted that the brick mode may resume the monitoring functionality at the standard frequency. However, the monitoring functionality may remain at a reduced frequency to quicken the rate at which the temperature of the UE 110 is reduced.

In 480, the UE 110 determines if the temperature of the UE 110 has lowered to an acceptable threshold of 38° C. As noted above, the acceptable threshold may be a fifth determination in the method 400 used when the UE 110 is in the brick mode so that the UE 110 may subsequently exit using the brick mode. Thus, if the temperature is more than 38° C., the UE 110 returns to 475 and the brick mode is resumed. However, if the temperature is no more than 38° C., the UE 110 continues to 485 where the brick mode is exited and subsequently returns to 420 where the standard mode is used.

It is noted that returning to 420 after 485 is only exemplary. Since the UE 110 is likely to have reached 38° C. and not below the first threshold of 36° C., the UE 110 may instead return to 450 where the second threshold is set to 38° C. In this manner, the UE 110 may immediately utilize the TRM to further reduce the temperature of the UE 110 and return to standard mode in a more efficient manner.

The methods 300 and 400 may also incorporate further features. For example, the exemplary embodiments may utilize an alert feature to notify the user when a particular operating mode is being used and the corresponding settings that are being instituted. For example, when the critical TRM is used, the monitoring functionality may be affected which may be of importance to the user. Thus, the UE 110 may generate an alert to inform the user that the monitoring functionality may not be measuring vital statistics at regular intervals but at a reduced interval. It is also noted that the alerts may not be used for each operating mode. For example, the alert may only be used for the critical TRM and the brick mode. Since the manner in which the user utilizes the UE 110 through inputs is largely unaffected by the regular, enhanced, and further enhanced TRMS, an alert may not be necessary.

The exemplary embodiments provide a device, system, and method of utilizing a plurality of operating modes including a standard mode, a temperature restricted mode, and a brick mode. With the impact to how the user may utilize the UE while in the brick mode, the temperature restricted mode is configured to prevent or delay when the UE uses the brick mode from a temperature of the UE satisfying a threshold associated with using the brick mode. Through a systematic approach in the temperature restricted mode where select operations are deactivated or modified, the temperature of the UE may not increase drastically such that the brick mode is required to be used. Thus, the time in which the UE is not using the brick mode is increased, instances of using the brick mode are avoided, and a user is able to use the device for emergency network operations or other critical network services if necessary.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
at a device connected to a wireless network:
determining a temperature of the device;
when the temperature is below a first threshold, enabling a first mode comprising select network operations;
when the temperature is above a brick threshold, enabling a second mode comprising disabling the select network operations; and
when the temperature is above the first threshold and below the brick threshold, enabling a third mode comprising modifying at least one of the select network operations;
determining whether the device is configured with a monitoring functionality that monitors a statistic of a user associated with the device, wherein, when the device is configured with the monitoring functionality, the first threshold is 34° C. and the brick threshold is 41° C., wherein the third mode comprises a first submode when the temperature is above the first threshold and below a second threshold, the first submode comprising throttling background data, wherein the third mode comprises a second submode when the temperature is above the second threshold and below a third threshold, the second submode comprising one of disabling carrier aggregation or scanning less frequently to return to full service from an out of service state or a limited service state, wherein the third mode comprises a third submode when the temperature is above the third threshold and below a fourth threshold, the third submode comprising one of extending an idle discontinuous reception (DRX) cycle or reducing a baseband clock speed, wherein the third mode comprises a fourth submode when the temperature is above the fourth threshold and below the brick threshold, the fourth submode comprising reducing a frequency with which the monitoring functionality is performed.

2. The method of claim 1, wherein the second threshold is 36° C., the third threshold is 38° C. and the fourth threshold is 40° C.

3. The method of claim 1, further comprising:
determining environmental conditions of a location in which the device is located,
wherein, when the environmental conditions indicate the temperature of the device is affected, the third mode is utilized.

4. The method of claim 1, wherein the temperature range of one of the submodes at least partially overlaps the temperature range of another one of the submodes.

5. The method of claim 1, further comprising:
determining a location of the device relative to environmental conditions,
wherein, when the disposition indicates the device is exposed to the environmental conditions, the third mode is utilized.

6. A device, comprising:
a transceiver configured to establish a connection to a wireless network;
a sensor configured to determine a temperature of the device; and
a processor configured to utilize a first mode, a second mode, or a third mode, when the temperature is below a first threshold, the processor enabling the first mode comprising select network operations, when the temperature is above a brick threshold, the processor enabling the second mode comprising disabling the select network operations, when the temperature is above the first threshold and below the brick threshold, the processor enabling the third mode comprising modifying at least one of the select network operations, wherein the processor further determines whether the device is configured with a monitoring functionality that monitors a statistic of a user associated with the device, wherein, when the device is configured with the monitoring functionality, the first threshold is 34° C. and the brick threshold is 41° C., wherein the third mode comprises a first submode when the temperature is above the first threshold and below a second threshold, the first submode comprising throttling background data, wherein the third mode comprises a second submode when the temperature is above the second threshold and below a third threshold, the second submode comprising one of disabling carrier aggregation or scanning less frequently to return to full service from an out of service state or a limited service state, wherein the third mode comprises a third submode when the temperature is above the third threshold and below a fourth threshold, the third submode comprising one of extending an idle discontinuous reception (DRX) cycle or reducing a baseband clock speed, wherein the third mode comprises a fourth submode when the temperature is above the fourth threshold and below the brick threshold, the fourth submode comprising reducing a frequency with which the monitoring functionality is performed.

7. The device of claim 6, wherein the second threshold is 38° C. and the third threshold is 40° C.

8. The device of claim 6, wherein the processor further determines a location of the device relative to environmental conditions, wherein, when the location indicates the device is exposed to the environmental conditions, a temperature restricted mode is utilized.

9. The device of claim 6, wherein the processor further determines environmental conditions of a location in which the device is located, wherein, when the environmental conditions indicate the temperature of the device is affected, a temperature restricted mode is utilized.

10. An integrated circuit, comprising:
first circuitry configured to establish a connection to a wireless network:
second circuitry configured to determine a temperature;
when the temperature is below a first threshold, third circuitry configured to enable a first mode comprising select network operations;
when the temperature is above a brick threshold, fourth circuitry configured to enable a second mode comprising disabling the select network operations; and
when the temperature is above the first threshold and below the brick threshold, fourth circuitry configured to enable a third mode comprising modifying at least one of the select network operations, wherein the integrated circuit further determines whether the device is configured with a monitoring functionality that monitors a statistic of a user associated with the device, wherein, when the device is configured with the monitoring functionality, the first threshold is 34° C. and the brick threshold is 41° C., wherein the third mode comprises a first submode when the temperature is above the first threshold and below a second threshold, the first submode comprising throttling background data, wherein the third mode comprises a second submode when the temperature is above the second threshold and below a third threshold, the second submode comprising one of disabling carrier aggregation or scanning less frequently to return to full service from an out of service state or a limited service state, wherein the third mode comprises a third submode when the temperature is above the third threshold and below a fourth threshold, the third submode comprising one of extending an idle discontinuous reception (DRX) cycle or reducing a baseband clock speed, wherein the third mode comprises a fourth submode when the temperature is above the fourth threshold and below the brick threshold, the fourth submode comprising reducing a frequency with which the monitoring functionality is performed.

11. The integrated circuit of claim 10, further comprising:
third circuitry configured to determine one of (i) a location of a device including the integrated circuit relative to environmental conditions, or (ii) environmental conditions in a location of the device,
wherein, when the location indicates the device is exposed to the environmental conditions or the environmental conditions indicate the temperature of the device is affected, the third mode is utilized.

* * * * *